United States Patent [19]

Iyengar et al.

[11] Patent Number: 4,530,344
[45] Date of Patent: Jul. 23, 1985

[54] HEAT-RADIATING COVER FOR FOOD PLATES

[75] Inventors: Mike Iyengar, Chicago, Ill.; Gail Gallagher, San Clemente, Calif.

[73] Assignee: American Hospital Supply Corporation, Evanston, Ill.

[21] Appl. No.: 518,174

[22] Filed: Jul. 28, 1983

[51] Int. Cl.³ .................... A47G 23/04; B65D 21/02; B65D 6/10
[52] U.S. Cl. .................... 126/246; 206/503; 206/508; 206/519; 206/545; 220/215
[58] Field of Search ............. 220/215; 206/545, 508, 206/502, 503, 519; 126/246, 273.5

[56] References Cited

U.S. PATENT DOCUMENTS

| | | | |
|---|---|---|---|
| 930,204 | 8/1909 | Marsh | 126/273.5 |
| 1,805,198 | 5/1931 | Zallio | 206/502 |
| 2,412,178 | 12/1946 | Seigh | 206/519 |
| 3,019,783 | 2/1962 | Clarke | 126/246 |
| 3,613,933 | 10/1971 | Pilz | 206/545 |
| 4,086,907 | 5/1978 | Rothschild | 126/246 |

*Primary Examiner*—George E. Lowrance
*Attorney, Agent, or Firm*—Patrick F. Bright; Donald L. Barbeau

[57] ABSTRACT

A heat-radiating cover for food dishes includes an outer shell joined at its periphery to the periphery of an inner shell having a shape complentary to and fitting within the outer shell and, mounted atop the outer shell and in the space between the outer and inner shells, a heat sink for absorbing radiating heat through the inner shell to the space beneath it, with the balance of the space between the inner and outer shells filled with insulation.

5 Claims, 10 Drawing Figures

HEAT-RADIATING COVER FOR FOOD PLATES

This invention relates to means for covering food plates comprising an outer shell joined at its periphery to the periphery of an inner, thermoplastic shell having a shape complementary to, and fitting within the outer plastic shell. Mounted atop the outer plastic shell, and in the space between the outer and inner shells, is means for absorbing and radiating heat through the inner plastic shell to the space beneath the inner plastic shell. The rest of the space between the inner and outer plastic shells is filled with means for minimizing absorption and radiation of heat through the outer plastic shell. The shell itself may be round, square, eliptical or some other shape.

The outer and inner plastic shells are preferably made of a thermosetting material or thermoplastic such as polysulfone. The shapes of the inner and outer plastic shells are complentary to one another, and the inner plastic shell is dimensioned appropriately to fit within the outer plastic shell, leaving a space between the inner and outer plastic shells. At the periphery of both the inner and outer plastic shells are means, preferably integrally molded with the shells, for joining the shells to one another at their peripheries, preferably by electromagnetic bonding techniques. To effect such bonding, a strip comprising iron filings embedded in polycarbonate is placed at the peripheries before bonding takes place.

In the preferred embodiment, the inner and outer shells each include, at their peripheries, two concentric rims with a groove between them. Preferably, the inner plastic shell has two peripheral, upwardly-projecting concentric rims with a groove between them; the outer plastic shell, two downwardly projecting, peripheral concentric rims with a groove between them. The grooves on the inner and outer shells are appropriately dimensioned and positioned to fit within one another, insuring a tight, waterproof seal when the two shells are bonded to one another at their peripheries.

The inner shell preferably has, at its top, outer surface, a pair of posts or other means for engaging and holding the means for absorbing and radiating heat downwardly through the inner shell, and into the space beneath the inner shell. The inner surface of the inner shell may be textured to minimize the apparent effects of spotting and scratching. The outer surface of the inner shell may also include stacking ribs (or grooves) that space one cover from another when they are stacked one atop the other.

In the preferred embodiment, the inner and outer shells are frustoconical, with a substantially flat, closed, circular upper wall joined to (preferably molded with) a conical side wall, open at the bottom. At the bottom edge of the conical side wall are the means for joining the periphery of the outer shell to the periphery of the inner shell to form a tight, waterproof seal between them. These means include one or more keys and keyways to seat and orient the inner shell properly within the outer shell.

The top, outside surface of the outer shell preferably includes at its center, a cavity of sufficient size to permit reaching beneath a handle joined to the outer surface and extending over the cavity. This surface also includes means (e.g., two holes) for joining the handle thereto. Such holes also provide means for filling the space between the inner and outer shells with insulating material such as a foamed plastic, and in preferred embodiment, a foamed polyurethane plastic. The outer surface of the outer shell can be pebbled or textured to minimize water spots and scratching.

The means for absorbing and radiating heat through the top surface of the inner shell to the space beneath the inner shell is, in preferred embodiment, an aluminum heat sink in the form of a doughnut. The heat sink includes means for engaging complementary means (e.g., upwardly-projecting posts), on the top, outer surface of the inner shell for holding the heat sink in place thereon.

To make our new means for covering food dishes, we separately form the inner and outer shells, preferably by injection molding. Next, we place the heat sink atop the inner shell, and attach the heat sink thereto, by staking one or more plastic posts to the heat sink, by mechanical fasteners, or otherwise. We then put the outer shell over the inner shell, and weld them to one another, by electromagnetic welding or otherwise, at their peripheries. A strip of metal filings embedded in a plastic such as polycarbonate is used to effect such bonding. Thereafter, we fill the rest of the space between the inner and outer shells with a foamable urethane, which we foam in place to fill the rest of the space between the inner and outer shells. We attach a handle, preferably a handle with projections at each end for insertion into the holes atop the outer shell, and, if necessary, seal the holes. The handle spans the cavity in the center of the outer shell, facilitating easy handling of the new covering means.

Our invention can better be understood by reference to the drawings, in which.

Figure 1:
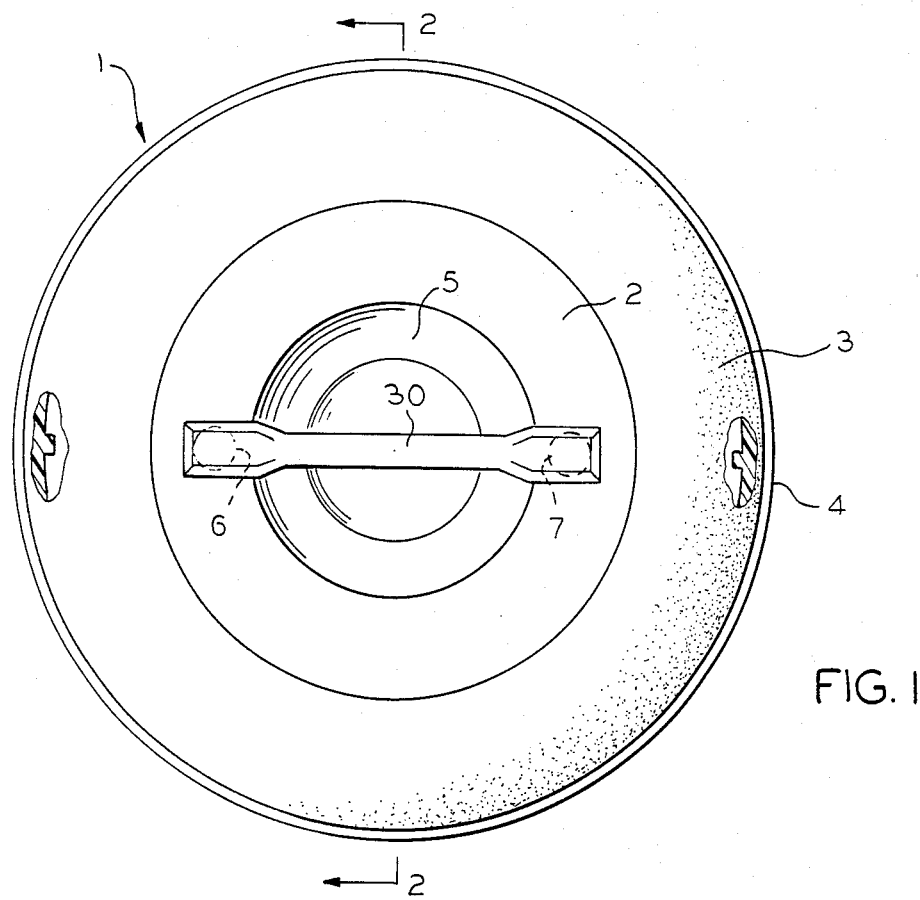
FIG. 1 is a top plan view of the outer shell of our cover.

FIGS. 5-10 show the inner shell, generally designated 1a, of our new cover. Inner shell 1a includes flat, circular upper surface 13, integrally molded with and joined to conical side wall 14 and peripheral rim structure 15. Projecting upwardly from the top surface of inner shell 1a are posts 22 and 23 (see FIGS. 2 and 4) for engaging and holding heat sink 24 on this surface. Side wall 14 has four stacking ribs 16, 17, 18 and 19 on the inner surface of outer shell 1 (see FIGS. 1-4). These ribs serve to space two or more covers from one another when they are stacked on one another. Stacking our new covers in this way permits heated air to directly contact the inner surface of the cover, and to heat the heat sink beneath this surface. Dimples 20 and 21 on rim structure 15 provide means for seating the cover on the edge or rim of a dish with minimal rocking. Rim structure 15 (see FIGS. 2 and 3) includes concentric, peripheral upward projections 26 and 27 with groove 28 between them. Downward projection 30 has a shape appropriate for engaging the outer lip of a plate for holding food, preferably hot food, and for minimizing escape of heat where rim structure 15 engages the edge of a plate (see FIG. 9).

FIGS. 1-4 show the outer shell, generally designated 1, of our new cover means. Outer shell 1 includes flat, circular upper surface 2 integrally joined to conical side wall 3, and rim structure 4 at the base of side wall 3. At the center of upper surface 2 is cavity 5 formed by beveled surface 8 and floor surface 9 (see FIGS. 2 and 3). Upper surface 2 of outer shell 1 includes holes 6 and 7. Holes 6 and 7 can also receive and engage projections from a handle for the cover means.

Figure 2:
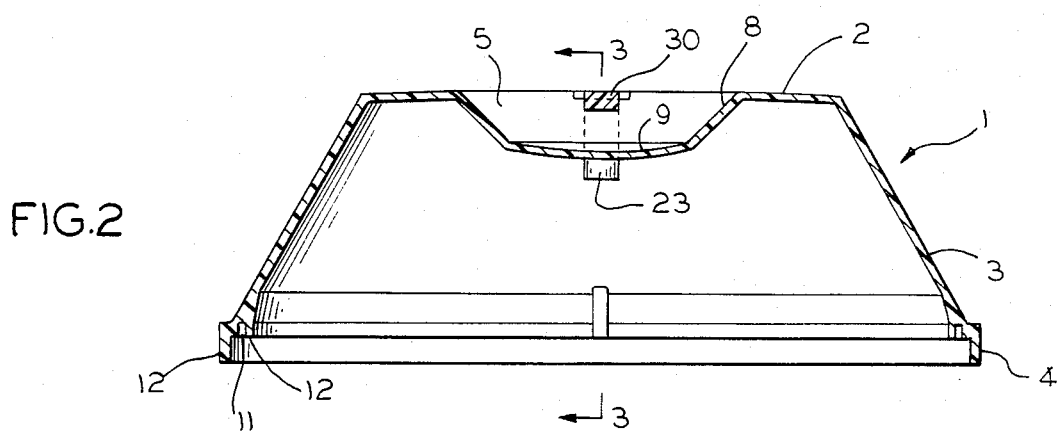
FIG. 2 is an elevation view, in cross-section, of the outer shell shown in FIG. 1, taken on line 2—2 of FIG. 1.
Figure 3:
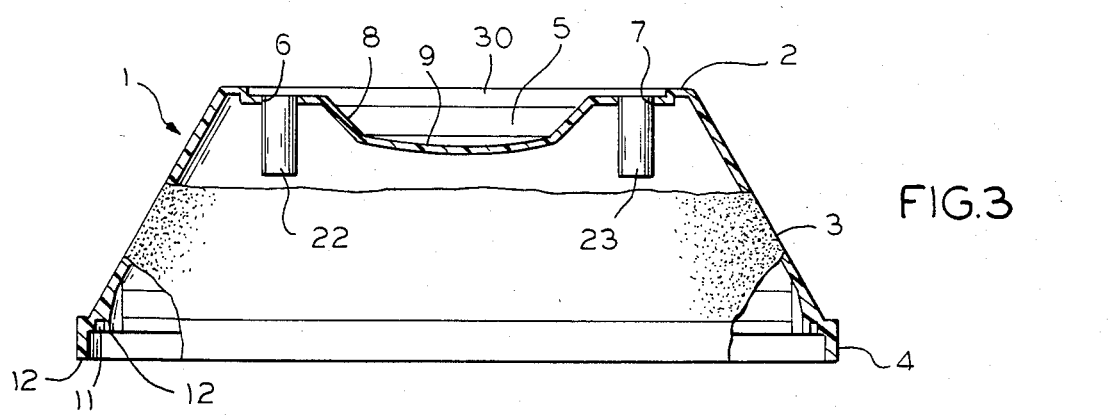
FIG. 3 is a side elevation view of the outer shell shown in FIGS. 1 and 2, with a portion of its side wall broken away to show the cavity in the shell's top surface.
Figure 4:
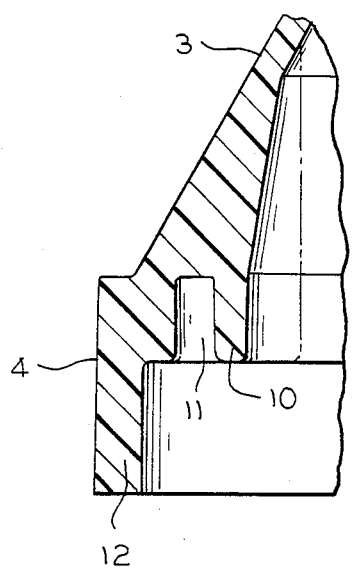
FIG. 4 is an exploded view of the periphery of the shell shown in FIGS. 1-3.
Figure 5:
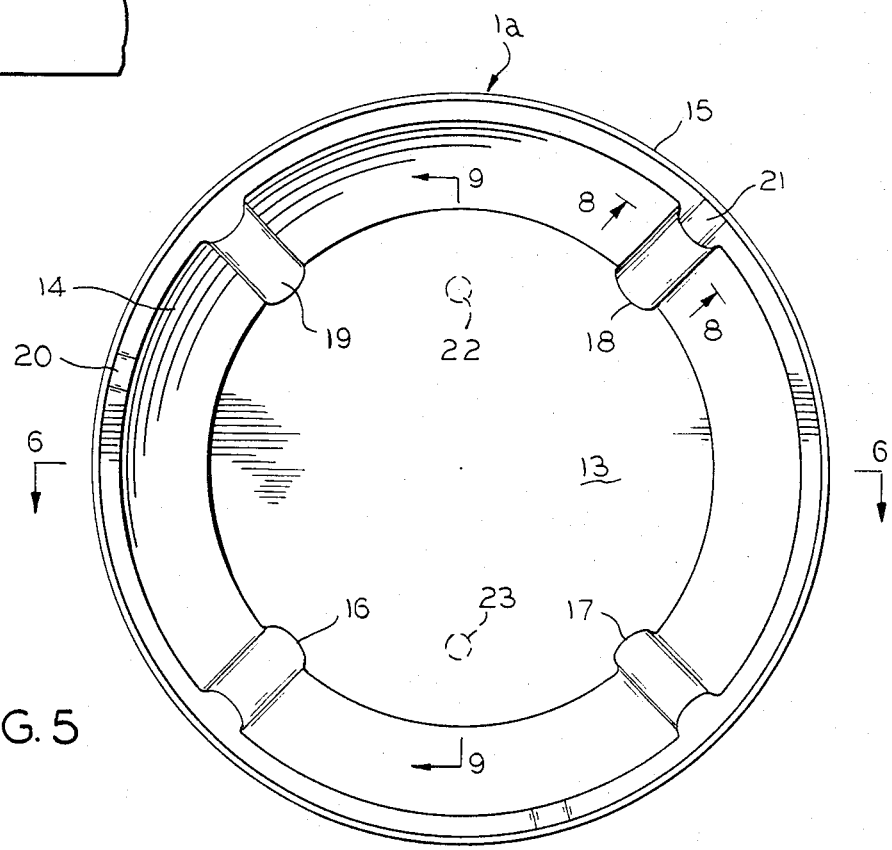
FIG. 5 is a top plan view of the inner shell of our new cover means.
Figure 6:
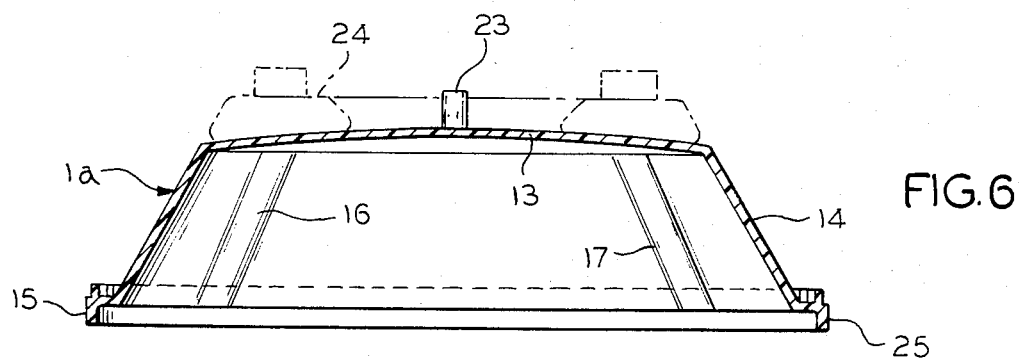
FIG. 6 is an elevation view in cross-section of the inner shell shown in FIG. 5, taken on line 6—6 of FIG. 5.
Figure 7:
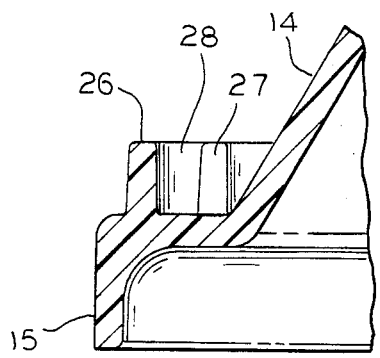
FIG. 7 is an exploded detail view of the periphery of the inner shell shown in FIGS. 5 and 6.
Figure 8:
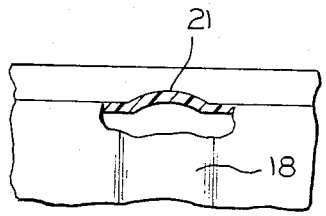
FIG. 8 is an exploded detail view of one of the antirocking dimples on the rim of our cover.
Figure 9:
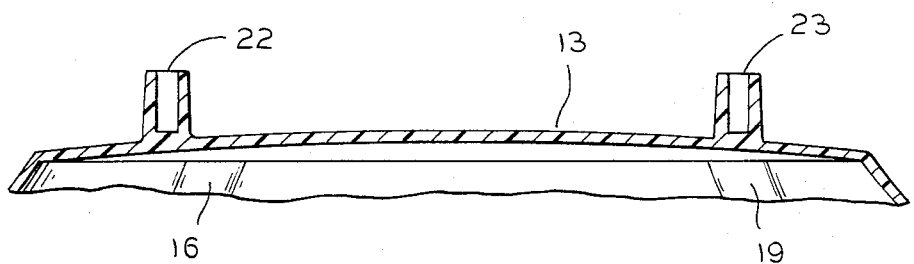
FIG. 9 is an exploded detail view of a portion of the outer top surface of the inner shell shown in FIGS. 5-7.
Figure 10:
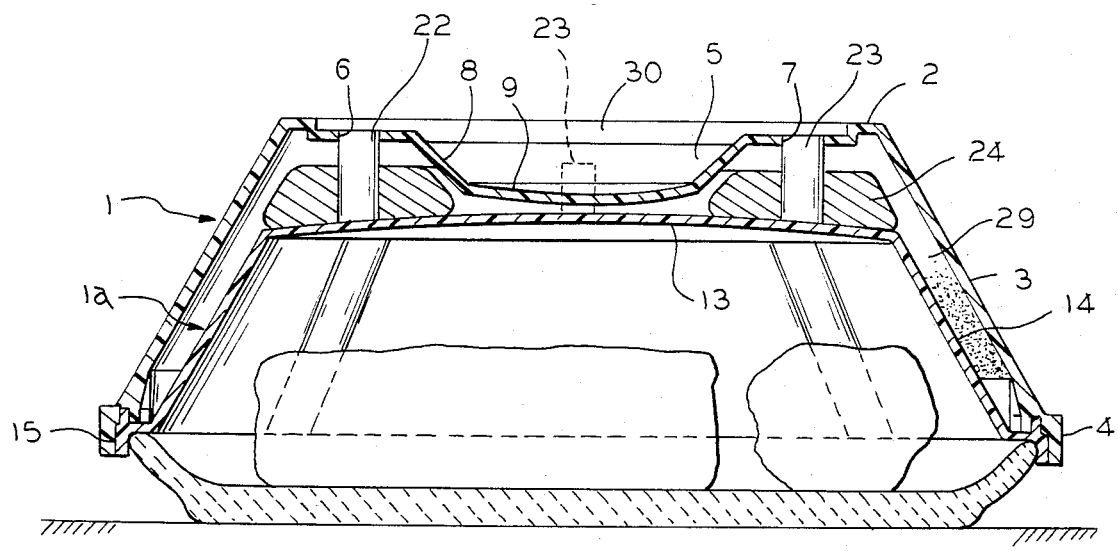
FIG. 10 is a side elevation view in cross-section of the assembled cover in place on a plate having a complementary edge structure for receiving the cover.

As best seen in FIGS. 2 and 4, rim structure 14 includes downwardly facing projections 10 and 12 with groove 11 between them. As FIG. 9 shows, rim structure 4 interlocks with rim structure 25 on inner shell 1a. Inner and outer shells 1 and 1a are bonded to one another at these peripheries, preferably by electromagnetic welding or bonding. Other bonding methods, such as solvent bonding, are also effective for this purpose.

FIG. 9 shows, in cross-section, an elevation view of the new cover means with inner and outer shells 1 and 1a joined to one another at their periphery. Aluminum heat sink 24 rests atop the top surface of inner shell 1a, and is held in place by posts 22 and 23. The rest of the space between inner shell 1a and outer shell 1 is filled with foamed-in-place urethane plastic 29, which insulates the cover and prevents radiation of heat from heat sink 24 outwardly through outer shell 1. Handle 30 bridges cavity 5, and fits within holes 6 and 7, sealing them tightly.

To make our new cover, we injection-mold inner and outer shells 1a and 1 from a thermoplastic such as polysulfone; separately form heat sink 24; mount heat sink 24 on posts 22 and 23; place outer shell 1 over inner shell 1a; weld outer shell 1 to inner shell 1a at their peripheries to form a tight, waterproof seal; and fill the remaining space between outer shell 1 and inner shell 1a with a foamable plastic such as foamable polyurethane plastic. The foamable plastic is inserted into the space between the inner and outer shells through either hole 6 or hole 7, and foamed in place. Finally, handle 30, with downward projections at its ends, is joined to outer shell 1 by inserting the projections from handle 30 into blowholes 6 and 7, and welding the handle in place.

As FIG. 9 shows, the rim structure of our new cover is complementary with the rim structure of a plate over which the cover is placed, minimizing heat loss at the interface. Because heat sink 24 rests on the top surface of inner shell 1a, and has polyurethane foam 29 surrounding it, heat tends to radiate downwardly into the space beneath the inner shell, and not outwardly through outer shell 1.

In use, the entire cover is heated until heat sink 24 absorbs sufficient heat energy. The cover is then placed over a plate carrying hot food. The heat from the heat sink radiates downwardly into the space inside the cover, and mixes with the heat from the food, maximizing heat retention while minimizing formation of condensate inside the cover. Foods on the plate tend to retain heat and moisture. Moreover, because the heat sink absorbs and radiates heat downwardly only, the cover exterior cools quickly, facilitating prompt post-heating use.

What is claimed is:

1. A heat-radiating cover for food plates comprising:
   an outer shell of plastic material joined at its periphery to the periphery of an inner shell of plastic material, said inner shell having a shape complementary to said outer shell;
   said inner shell fitting within said outer shell to define a space therebetween, and said joined shells having a size and shape sufficient to cover a food plate and a downwardly projecting flange disposed on the outer edge of the peripheral rim thereof for engaging the outer portion of a food holding plate and for minimizing escape of heat therefrom;
   said outer shell having a cavity in the central portion of the top thereof, a handle extending across said cavity, and a means for attaching the handle to the outer surface at its top, said cavity having a size and shape sufficient to permit a hand to pass beneath said handle;
   a means for absorbing and radiating heat disposed in contact with the top surface of said inner shell and within the space between said outer and inner shells;
   a post means disposed on the top surface of said inner shell and projecting upwardly through said heat absorbing means for engaging and holding said heat absorbing means;
   a plurality of ribs disposed on the lower surface of said inner shell so that two or more covers can be stacked and heated air directly contacts the surface of the inner shell adjacent the heat absorbing means;
   a plurality of spaced projections disposed on the peripheral rim of said inner shell and projecting downwardly for seating the cover on the outer portion of the food holding plate; and
   a means for insulating the entire space between said inner and outer shells not occupied by said absorbing and radiating means, such that the heat from the absorbing and radiating means radiates downwardly directly through said inner shell into the space between the cover and the food holding plate, and the insulating means minimizes absorption or radiation of heat outwardly through said outer shell.

2. The cover means of claim 1 wherein said outer and said inner shells are frustoconical.

3. The cover means of claim 1 wherein said outer and said inner shells are frustoconical, and made of polysulfone.

4. The cover means of claim 1 wherein said outer shell includes, at its periphery, two concentric rims with a groove between said rims for engaging complementary means at the periphery of said inner shell.

5. The cover of claim 1 wherein the plastic material is polysulfone.